United States Patent [19]

Tilton

[11] 4,185,581

[45] Jan. 29, 1980

[54] WEIGHT RESPONSIVE SPRAY BIRD-SCARE PERCH

[76] Inventor: Steven D. Tilton, Rte. 2, Waubun, Minn. 56589

[21] Appl. No.: 924,044

[22] Filed: Jul. 12, 1978

[51] Int. Cl.² .......................... E04B 1/72; G08B 15/02
[52] U.S. Cl. .................... 116/22 A; 52/101; 119/159
[58] Field of Search ............ 116/22 A, 22 R; 52/101; 119/159; 43/124; 340/573, 666

[56] References Cited

U.S. PATENT DOCUMENTS

| | | | |
|---|---|---|---|
| 1,563,414 | 12/1925 | Wierdsma | 119/76 |
| 1,894,563 | 1/1933 | Jones | 119/97 R X |
| 2,350,187 | 5/1944 | Pfeiffer | 52/101 |
| 2,862,765 | 12/1958 | Wing | 43/124 X |
| 2,920,600 | 1/1960 | Hori et al. | 116/22 A |
| 3,041,911 | 7/1962 | Marder | 119/26 X |
| 3,092,076 | 6/1963 | Novello | 119/26 |
| 3,103,465 | 9/1963 | Goodue et al. | 47/1 R |
| 3,108,574 | 10/1963 | Albers | 119/159 |
| 3,113,072 | 12/1963 | Goodue et al. | 43/124 X |
| 3,113,304 | 12/1963 | Lindley | 116/22 A X |
| 3,294,893 | 12/1966 | Shaffer | 174/70 |
| 3,436,882 | 4/1969 | Keefe | 52/101 |
| 3,656,141 | 4/1972 | Hill | 116/22 A X |
| 4,038,639 | 7/1977 | Kuebler | 52/101 X |

FOREIGN PATENT DOCUMENTS 228907 11/1909 Fed. Rep. of Germany ........ 116/22 A

*Primary Examiner*—Daniel M. Yasich
*Attorney, Agent, or Firm*—Merchant, Gould, Smith, Edell, Welter & Schmidt

[57] ABSTRACT

A bird scare perch is disclosed. The bird scare perch is comprised of an elongated member which forms a perch upon which birds can land. A plurality of spray nozzles are supported adjacent to and directed at the elongated member. A source of fluid, preferably a liquid, communicates with the spray nozzles. A control mechanism, actuated by birds landing upon the elongated member, activates the flow of the fluid out of the spray nozzles. In this manner, the birds which have landed upon the elongated member are sprayed and placed in distress.

15 Claims, 5 Drawing Figures

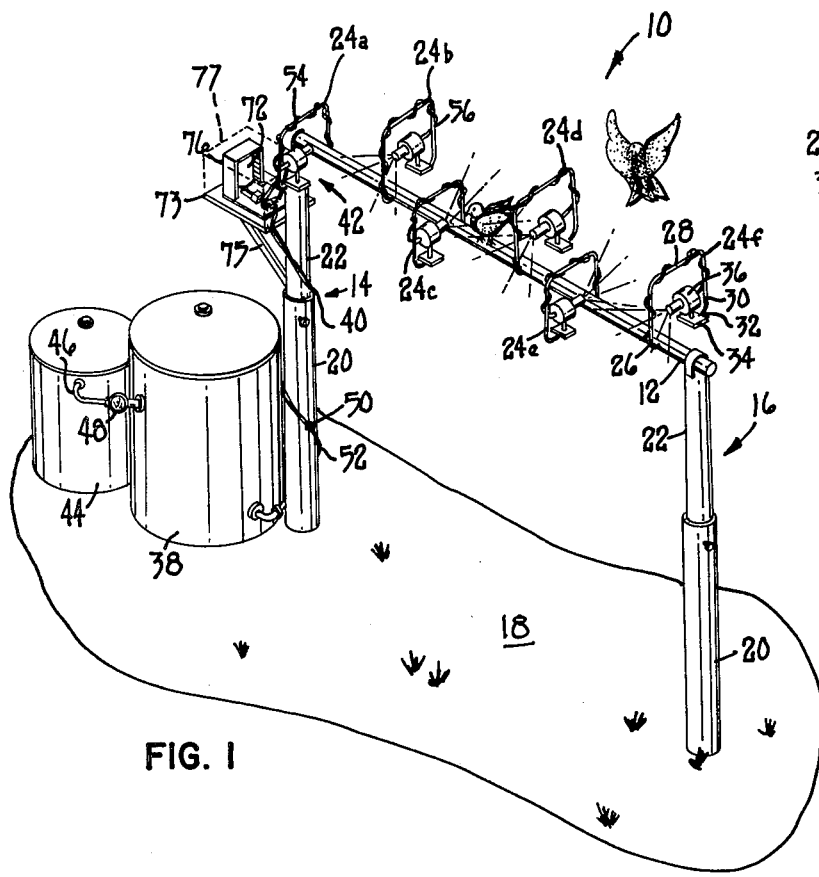
FIG. 1
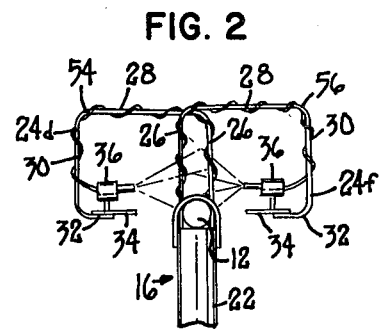
FIG. 2
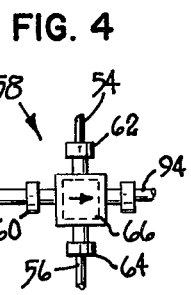
FIG. 4
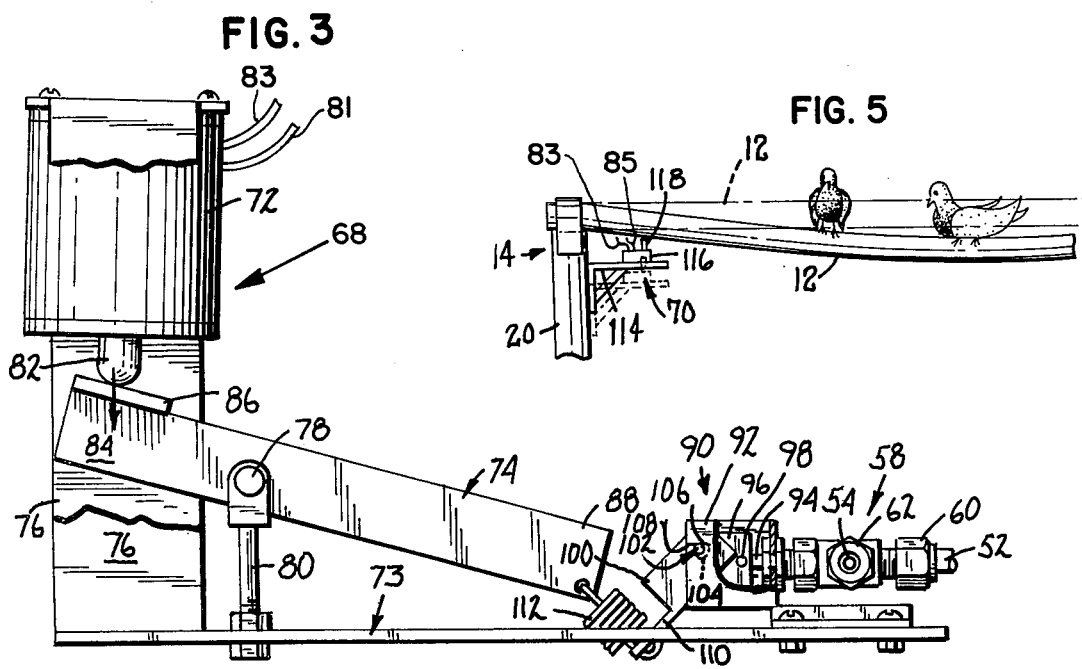
FIG. 3
FIG. 5

WEIGHT RESPONSIVE SPRAY BIRD-SCARE PERCH

BACKGROUND OF THE INVENTION

The present invention relates broadly to devices for scaring birds away from an area. More specifically, the present invention relates to a device adapted to be placed in a crop field for the purpose of scaring away birds from the crops in order to prevent pilferage of the crops by birds.

Numerous devices have been used in the past to scare away birds. Bird scare devices have been found useful in both urban and agricultural environments.

U.S. Pat. No. 2,350,187 of Pfeiffer; U.S. Pat. No. 3,294,893 of Shaffer; and U.S. Pat. No. 3,436,882 of Keefe disclose bird scare devices especially adapted for use with building structures. Such devices find particular use for scaring away pigeons, starlings and the like from residential and commercial buildings.

U.S. Pat. No. 2,920,600 of Hori et al. discloses an imtermittent exploding device for scaring away birds from crop fields.

U.S. Pat. No. 4,038,639 of Kuebler discloses a bird perch alarm which produces an audible signal when a bird lands upon the perch.

U.S. Pat. Nos. 3,103,465 and 3,113,072 of Goodhue et al. disclose bird repellant compositions for placement upon crops, foods, grain and the like.

U.S. Pat. No. 3,041,911 of Marder and U.S. Pat. No. 3,092,076 of Novello disclose pet bird toys activated by the weight of a bird landing on a perch.

U.S. Pat. No. 3,108,574 of Albers discloses a cow washing device activated by the weight of a cow.

U.S. Pat. No. 1,563,414 of Wierdsma and U.S. Pat. No. 1,894,563 of Jones disclose poultry water fountains activated by the weight of a bird such as a chicken.

SUMMARY OF THE INVENTION

The present invention relates to a bird scare perch. A perch means is provided upon which birds can land. A spray means is supported adjacent the perch means for spraying a fluid on birds landing on the perch means in order to scare the birds. A control means actuated by birds landing on the perch activates the spray means.

In the preferred embodiment, the perch means includes an elongated member supported in a generally horizontal position upon a pair of adjustable uprights. The spray means includes a plurality of spray nozzles spaced along the length of the elongate member and directed at the elongate member. A tank contains a liquid to be sprayed at the birds through said nozzles and a conduit connects the tank with the spray nozzles. The tank is held under pressure and the control means controls a valve for allowing the liquid to flow through the conduit to the spray nozzles.

In the preferred embodiment, the control means includes a microswitch supported upon one of the uprights and engagable by the motion of the elongated member which is caused by birds landing upon the elongated member perch. The microswitch controls a solenoid which in turn controls the valve disposed in the conduit.

The liquid sprayed upon the birds is preferably a soap solution which irritates the eyes of the birds and washes some of the oils from the birds' feathers. In this manner, the birds are temporarily disabled and cannot fly. The birds are therefore placed in distress and ward off other birds.

Various advantages and features of novelty which characterize the invention are pointed out with particularity in the claims annexed hereto and forming a part hereof. However, for a better understanding of the invention, its advantages, and objections attained by its use, reference should be had to the drawings which form a further part hereof, and to the accompanying descriptive matter, in which there is illustrated and described a preferred embodiment of the invention.

BRIEF DESCRIPTION OF THE DRAWING

FIG. 1 is a perspective view of a bird-scare perch in accordance with the present invention;

FIG. 2 is a partial side elevational view of the perch;

FIG. 3 is a side elevational view with portions broken away of a control mechanism;

FIG. 4 is a plan view illustrating a control valve; and

FIG. 5 is a front elevational view illustrating a pair of birds flexing the elongated member.

DETAILED DESCRIPTION OF THE INVENTION

Referring to the drawings in detail, wherein like numerals indicate like elements, there is shown in FIG. 1 a bird-scare perch apparatus in accordance with the present invention designated generally as 10. The apparatus 10 includes a perch means which is comprised of an elongated member 12. The elongated member 12 is preferably made of a rigid yet somewhat flexible rod, such as ¾" re-rod.

A pair of generally vertically extending members or uprights 14, 16 support the elongated member 12 in a generally horizontal disposition above the ground or support surface 18. Each upright 14, 16 includes a first section 20 and a second section 22 telescopic thereto. In this manner, the height at which the elongated member 12 is supported above the ground 18 can be adjusted. Generally, the elongated member or perch means 12 is supported approximately ten feet above the ground 18.

A plurality of support arms 24a-24f are attached to and extend generally horizontally from the elongated member 12. Each support arm 24 preferably takes on the configuration shown in FIG. 2. As seen therein, each support arm 24 takes on a partially rectangular configuration wherein a first vertically extending portion 26 is attached to and extends upwardly from the elongated member 12, a first horizontally extending portion 28 extends generally away from the first portion 26, a second vertically extending portion 30 extends downwardly from the portion 28, and a second horizontally extending portion 32 extends generally horizontally inward from the portion 30 toward the elongated member 12. A support platform 34 is attached to or forms the distal end of said portion 32. The support arms 24 can be formed of ¼" rod which is welded to the elongated member 12.

A spray nozzle 36 is supported on each of the support platforms 34. The support arms 24 are arranged in a spaced disposition along the length of the elongated member 12. Adjacent support arms, such as support arms 24a, 24b, extend in opposite directions from the elongated member 12. The spaced disposition of the support arms 24 permits the spray nozzles 36 to spray a fluid along substantially the entire length of the elongated member 12.

A storage tank 38 is provided for holding a liquid to be sprayed through the nozzles 36. The liquid is preferably an organic solution such as a mixture of liquid soap and water. The soap solution when sprayed on birds removes oil from the feathers of birds and also irritates the eyes of the birds. The soap solution, however, does not cause any permanent bodily harm and the birds will recover after a short period of time. A conduit means 40 connects the tank 38 with the spray nozzles 36. The liquid in the tank is maintained under pressure and a control means 42 controls the flow of the liquid through the conduit means 40 to the spray nozzles 36.

In order to maintain the liquid in tank 38 under pressure, a pressurized air tank 44 is connected thereto via a conduit 46 and a pressure regulator 48. The tank 38 is preferably a 30-gallon storage tank and the air tank 44 is preferably a 10-gallon tank maintained at approximately 100 pounds/square inch pressure. The pressure regulator 48 is adjusted to maintain 35 pounds/square inch of pressure on the liquid in the tank 38. An on-off valve, such as a globe valve 50, is connected to the conduit means 40 so that the tanks 38, 44 may be separated from the remainder of the apparatus 10 in order to be independently transportable.

The conduit means 40 is comprised of a main conduit 52 leading from the tank 38 and a pair of branch conduits 54, 56 connected to the spray nozzles 36. The conduits 52–56 are preferably made of ¼" plastic tubing. The branch conduits 54, 56 are connected to the elongated member 12 and the arms 24 in any suitable manner, such as by wrapping around the elongated member 12 and the arms 24 or by attachment thereto by suitable retainers or clips.

The main conduit 52 is connected to the branch conduits 54, 56 by a wand valve 58 which forms a part of the control means 42. The wand valve 58 has an inlet port 60 connected to the main conduit 52, a first outlet port 62 connected to the branch conduit 54 and a second outlet port 64 connected to the branch conduit 56. A movable valve or seal member 66 is movable within the wand valve 58 to block communication between the inlet port 60 and the two outlet ports 62, 64.

The position of the movable seal member 66 is controlled by a solenoid mechanism 68, which in turn is controlled by a switch means 70. The solenoid mechanism 68 includes a solenoid 72 and a pivotal lever 74. A platform 73 is attached directly to the upright 14 and is provided with additional support by a brace 75. The platform 73 supports the components of the solenoid mechanism 68. The solenoid 72 is supported on the platform 73 by means of a bracket 76. A cover or housing 77 surrounds the solenoid mechanism 68 and the wand valve 58 to provide protection against rain, wind and the like. The lever arm 74 is supported about a pivot axis 78 by a support rod 80.

The solenoid 72 includes a piston rod 82 movable upwardly and downwardly in a conventional manner. A first end 84 of the lever 74 is disposed below the piston rod 82 and has a striker pad 86 attached to its upper surface. The striker pad 86 serves as a contact point on the lever 74 for the piston rod 82. A second end 88 of the lever 74 is attached to a coupling mechanism 90 which couples the lever 74 to the movable valve 66 of the wand valve 58.

The coupling mechanism 90 includes a yoke 92 which is fixedly secured to a portion of the wand valve 58 adjacent the movable valve member 66. A pin 94 is connected to the valve member 66 and extends inwardly of the yoke 92. The valve member 66 and the attached pin 94 are spring-biased to a closed position, i.e., to the left in FIG. 4. An inner yoke 96 is coupled to the pin 94 by a connecting pin 98 passing through holes in the yokes 92, 96 and the connecting pin 98. An intermediate yoke 100 has arms extending between the yoke 92 and the inner yoke 96. The intermediate yoke 100 is coupled to the inner yoke 96 by a camming pin 102. The camming pin 102 has an eccentric central section 104 received within a hole in the arms of the yoke 100 and a hole in the inner yoke 96. The camming pin 102 also has a pair of end portions 106 which are received within slots 108 of the yoke 92. The end portions 106 are retained within the slots 108 by the bias of the valve member 66.

When it is desired to move the valve member 66 to an open position, the yoke 100 is rotated about an axis passing through the end portions 106 of the pin 102. Such rotation rotates the eccentric central section 104 in such a manner that the inner yoke 96 is moved away from the wand valve 58 and hence draws the pin 94 and the valve member 66 therewith.

The end 88 of the lever 74 is connected to a portion 110 of the yoke 100 by means of a spring 112. When the solenoid 72 is activated and its piston rod 82 is moved downwardly, the pad 86 is contacted and the lever 74 is pivoted about its axis 78 to rotate the end 88 upwardly. In turn, the yoke 100 is rotated about the ends 106 of the camming pin 102. In this manner, the yoke 96 and the pin 94 attached thereto draws the valve member 66 against its bias into an open position.

The switching means 70 operates in the following manner to actuate the solenoid 72 and thereby to move the sealing member 66 to its open position. See FIG. 5. (For purposes of clarity the arms 24 are not shown in FIG. 5 and the switching means 70 is not shown in FIG. 1.) A battery (not shown), such as a 12- volt DC battery, supplies the electrical power to the solenoid 72 through a conductor line 81 when actuated by the switching means 70. The switch means 70 includes a support arm 114 adjustably attached to the upright 14, that is, the support arm 114 can be secured at various locations along the length of the upright 14. An alternate position of the support arm 114 is shown in phantom line in FIG. 5. A microswitch 116 is carried by the support arm 114. The microswitch 116 has an actuator arm 118 which is disposed below and in close proximity to the elongated member 12. When the weight of a certain number of birds which have landed upon the elongated member 12 bends the member 12 downwardly, the actuator arm 118 is contacted and activates the microswitch 116 which in turn activates the solenoid 72 through a conductor line 83 connected to the solenoid 72 and a conductor line 85 connected to the battery. See FIG. 5. In this manner, the liquid is sprayed through the spray nozzles 36 upon the birds on the elongated member 12. After the birds leave the elongated member 12, the elongated member 12 returns to its unbent position and the microswitch 116 and the solenoid 72 are deactivated. The sealing member 66 returns to its closed position and the spray of liquid through the nozzles 36 is stopped. The position of the support arm 114 is adjusted so that the actuator arm 118 is activated only when a certain number of birds, such as 4, 5, or 6 birds, have landed upon the elongated member 12. When such a number of birds have landed upon the elongated member 12, there is a likelihood that a flock of birds is present. The support arm 114 is so positioned that the weight of a single bird would not activate the microswitch 116. In this manner, the liquid can be conserved until there is a higher likelihood of the presence of a flock of birds.

From the foregoing, the operation of the apparatus 10 should be self-explanatory and, hence, will be explained only briefly hereinafter. The apparatus 10 is placed in a field to be protected, such as a sunflower or corn field. The uprights 14, 16 are adjusted so that the elongated member 12 extends above the uppermost edge of the crops to thereby provide a perch means for birds. When a certain number of birds, generally indicative of the presence of a flock of birds, land upon the elongated member 12, the elongated member 12 flexes and activates the microswitch 116. The liquid contained in the tank 38 is sprayed through the nozzles 36 since the activation of the microswitch 116 has caused the solenoid mechanism 68 to move the seal member 66 of the wand valve 58 to its open position. The liquid, which is preferably a soap-water solution, washes the oil from the feathers of the birds and irritates the eyes of the birds. The birds so sprayed are thereby placed in distress and ward off the remaining birds of the flock. The sprayed birds are disabled for a short period of time and thereafter recover. Since the sensitivity with which the apparatus 10 is activated can be adjusted, the liquid is not wasted by being sprayed upon only one bird but rather is sprayed upon a number of birds indicative of the presence of a flock. Also, since the system utilizes a liquid to place the birds in distress, undesirable noise pollution of certain prior art devices is allieviated.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:
1. A bird-scare perch comprising:
   perch means for supporting a plurality of birds landing on said perch means;
   support means for supporting said perch means a distance above the ground;
   spray means supported adjacent said perch means for directing an irritating liquid spray on birds landing on said perch means to scare the birds;
   control means actuated by a preselected weight of a plurality of birds landing on the perch means for allowing a flow of liquid through said spray means when a plurality of birds have landed on said perch means, said control means including a switch means actuable by vertical movement of said perch means, and
   means for selectively positioning said switch means relative to said perch means for adjusting the amount of weight of birds landing on said perch means to actuate said switch means.

2. A bird-scare perch in accordance with claim 1 wherein said perch means includes an elongated member disposed generally horizontally and supported above the ground in a generally horizontal disposition by said support means.

3. A bird-scare perch in accordance with claim 2 wherein at least a portion of said elongated member is movable in a vertical direction to actuate said switch means.

4. A bird-scare perch in accordance with claim 2 wherein said support means includes at least one generally vertically extending member, said vertically extending member having an adjustable length.

5. A bird-scare perch in accordance with claim 4 wherein said support means includes two of said generally vertically extending members, and means for supporting said switch means on one of said generally vertically extending members at adjustable vertical positions thereon whereby the amount of vertical movement of said perch means required to activate said switch means is adjustable.

6. A bird-scare perch in accordance with claim 5 wherein said elongated perch member is comprised of a rigid rod capable of flexing when the weight of a plurality of birds is supported upon the rod.

7. A bird-scare perch in accordance with claim 1 wherein said spray means includes a tank for holding a liquid to be sprayed upon birds, means for applying pressure to said tank, spray nozzles supported adjacent said perch means and directed toward said perch means, and conduit means connecting said tank with said spray nozzles, said control means being coupled to said conduit for controlling the spraying of said liquid from said spray nozzles onto birds landing on said perch means.

8. A bird-scare perch in accordance with claim 7 wherein said control means also includes a solenoid actuated by said switch means and a valve means controlled by said solenoid for controlling the flow of said liquid in said conduit means, said perch means being movable in response to the landing of birds thereon in order to activate said switch means, and the activation of said switch means activating said solenoid to move said valve means whereby the flow of said liquid through said conduit to said spray nozzles is initiated.

9. A bird-scare perch in accordance with claim 8 wherein said perch means includes a rod supported by said support means in a generally horizontal disposition, said rod being flexible in response to the weight of birds landing thereon in order to activate said switch means.

10. A bird-scare perch in accordance with claim 9 wherein said liquid is an organic soap solution and said switch means is supported on said rod support means at a vertically adjustable position below said rod whereby the number of birds required to activate said switch means is adjustable.

11. A bird-scare perch in accordance with claim 9 including a plurality of support arms for supporting said spray nozzles, said support arms being attached to said rod at spaced locations along the length of said rod whereby said spray nozzles when activated can spray said liquid along substantially the entire length of said rod.

12. A bird-scare perch comprising:
   perch means including an elongated member;
   a pair of generally vertically extending support members for supporting said elongated member in a generally horizontal disposition;
   a plurality of spray nozzles supported adjacent to said elongated member at spaced horizontal positions therealong;
   a pressurized tank containing an irritating liquid to be sprayed on birds landing on said elongated member;
   conduit means coupling said pressurized tank to said spray nozzles; and control means activated by a preselected weight of a plurality of birds landing upon said elongated member for initiating the spraying of said liquid through said nozzles in response to the weight of a plurality of birds on said elongated member.

13. A bird-scare perch in accordance with claim 12 wherein said elongated member is comprised of a flexible rod, a plurality of support arms are connected to said rod at spaced locations along the length of the rod to support said spray nozzles, said support arms being arranged such that adjacent arms extend in opposite directions from said flexible rod.

14. A bird-scare perch in accordance with claim 13 wherein said control means includes a microswitch supported on one of said support members at a vertically adjustable position, a solenoid connected to and activated by said microswitch, and a valve means disposed in said conduit and controlled by said solenoid, said valve means being normally biased to a closed position wherein the flow of said liquid to said spray nozzles is prevented, said rod being capable of flexing in response to the weight of birds on the rod to contact said microswitch and activate said solenoid whereby said valve means is moved to an open position.

15. A bird-scare perch comprising:

perch means comprised of a flexible rod;

a pair of generally vertically extending support members for supporting said flexible rod in a generally horizontal disposition;

a plurality of support arms connected to and extending from said rod at spaced locations along the length of said rod;

a spray nozzle supported on each of said support arms and directed at said flexible rod to provide an irritating liquid spray path along substantially the entire length of said flexible rod;

a pressurized tank for holding an organic soap solution to be sprayed from said spray nozzles;

conduit means coupling said pressurized tank to said spray nozzles;

valve means coupled to said conduit means and movable between an open and a closed position for controlling the flow of said soap solution through said conduit means to said spray nozzles;

a solenoid for controlling the opening and closing of said valve means; and a microswitch for controlling this activation of said solenoid, said solenoid being supported on one of said vertically extending support members below said rod to be actuated by the downward flexing motion of said rod in response to a preselected weight of a plurality of birds landing thereon whereby said liquid would be sprayed upon birds landing on said rod.

* * * * *